United States Patent
Ng et al.

(10) Patent No.: US 11,171,794 B1
(45) Date of Patent: Nov. 9, 2021

(54) EIGHT CHANNEL SURGE PROTECTION FOR POWER OVER ETHERNET SOLUTIONS

(71) Applicant: HEWLETT PACKARD ENTERPRISE DEVELOPMENT LP, Houston, TX (US)

(72) Inventors: Kah Hoe Ng, Johor (MY); Tzye Perng Poh, Johor Bahru (MY); Khai Chiah Chng, Johor (MY)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/024,397

(22) Filed: Sep. 17, 2020

(51) Int. Cl.
  *H04L 12/10* (2006.01)
  *H02H 9/04* (2006.01)
  *H04L 12/40* (2006.01)

(52) U.S. Cl.
  CPC ............. *H04L 12/10* (2013.01); *H02H 9/044* (2013.01); *H04L 12/40045* (2013.01)

(58) Field of Classification Search
  USPC .......................................................... 713/320
  See application file for complete search history.

(56) References Cited

U.S. PATENT DOCUMENTS

| | | | |
|---|---|---|---|
| 2009/0207538 A1* | 8/2009 | Crawley | H04L 12/10 361/56 |
| 2018/0210527 A1* | 7/2018 | Panella | H01R 9/2491 |
| 2021/0104849 A1* | 4/2021 | Kong | H01R 24/64 |

OTHER PUBLICATIONS

Designing a PD69208A PoE System 802.3af/802.3at Compliant, (Research Paper), Nov. 10, 2015, pp. 1-21, One Enterprise Aliso Viejo, CA, USA.
Picard, J., Electrical Transient Immunity for Power-Over-Ethernet, (Research Paper), Aug. 2006, pp. 1-20, Texas Instruments, Dallas, TX, USA.
Protecting PoE Systems from Lightning and Other Electrical Hazards, (Research Paper), Circuit Protection Solutions, Apr. 6, 2016, 5 pgs., issue 2, Littlefuse.
TPS2388 IEEE 802.3AT 8-Channel Power-Over-Ethernet PSE Controller, (Research Paper), Aug. 2017, 83 pgs., Texas Instruments, Dallas, TX, USA.

* cited by examiner

*Primary Examiner* — Robert A Cassity
(74) *Attorney, Agent, or Firm* — Sheppard Mullin Richter & Hampton LLP

(57) ABSTRACT

Systems and methods are provided for 8-channel surge protection for a network utilizing Power Over Ethernet (PoE). Four Bob Smith terminations are arranged such that one Bob Smith termination is coupled to each of four PoE nodes. Each Bob Smith termination includes a capacitor and a resistor pair coupled in series between its respective PoE node and a respective Bob Smith termination node, wherein a first pair of the Bob Smith terminations is connected between their respective PoE nodes and a first Bob Smith node and a second pair of the Bob Smith terminations is connected between their respective PoE nodes and a second Bob Smith node. The first Bob Smith node is capacitively isolated from ground via a first terminating capacitor component and a second Bob Smith node is capacitively isolated from ground via a second terminating capacitor component separate from the first terminating capacitor component.

20 Claims, 9 Drawing Sheets

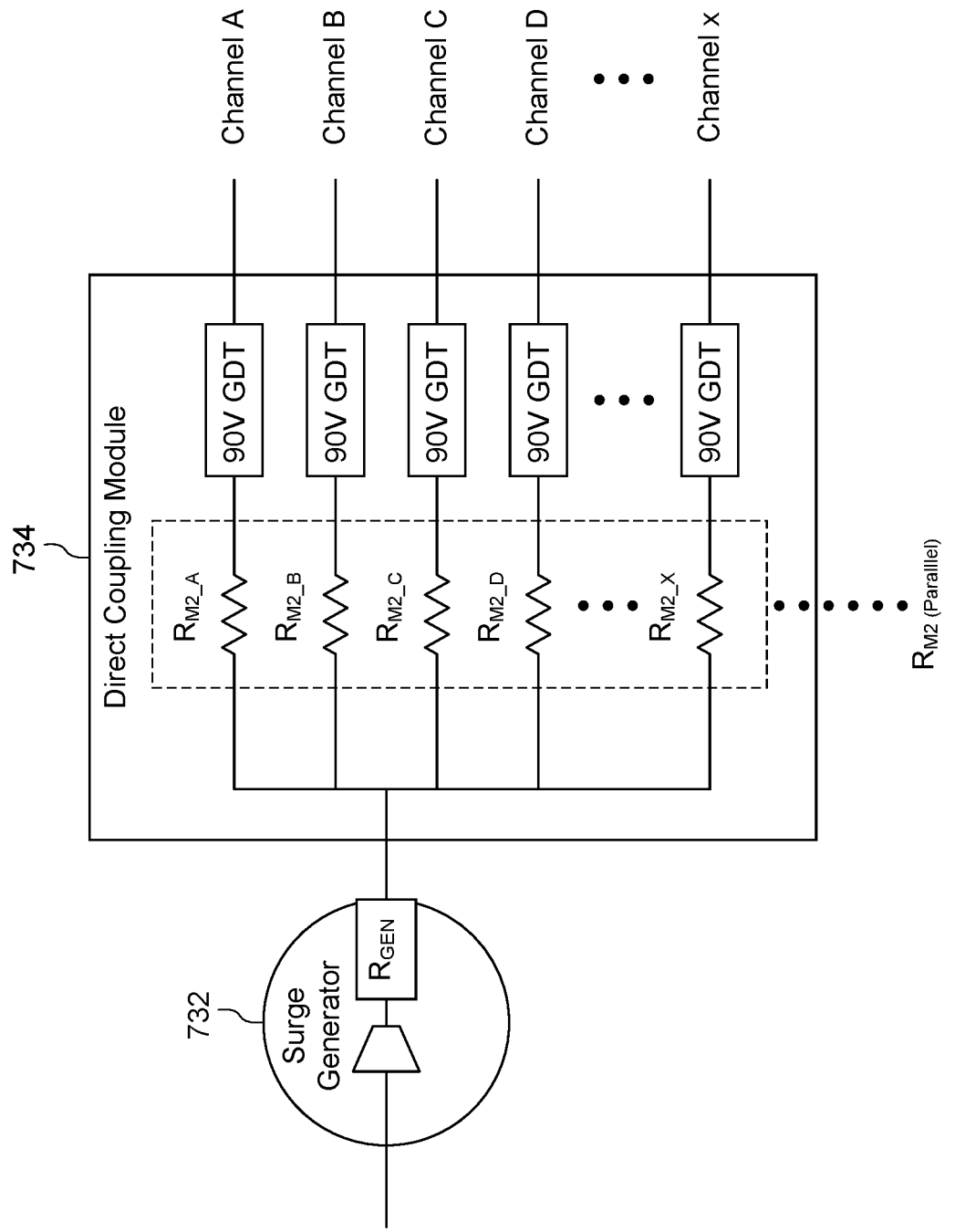

EIGHT CHANNEL SURGE PROTECTION FOR POWER OVER ETHERNET SOLUTIONS

DESCRIPTION OF RELATED ART

In Power over Ethernet (PoE) equipment, an Ethernet cable is used to deliver power from the power-sourcing equipment (PSE). The power is delivered using twisted-wire pairs used for data channels through a difference between respective common-mode voltages. Although PoE specifications address overcurrent protection, PoE equipment is still vulnerable to high-energy surge events that can damage the equipment. Data I/O Surge Immunity may refer to a quality requirement for PoE to evaluate a system's sensitivity to high-energy surge events. A Bob Smith termination may be used to reduce the longitudinal or common mode current on twisted pair or other multi-conductor communication systems. The conventional Bob Smith termination may use a resistor for common mode impedance matching at each signal pair, and the resistors may be connected to chassis ground via a capacitor.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2, which comprises

FIG. 7 illustrates an example surge generator that can be used in accordance with various embodiments.

The figures are not exhaustive and do not limit the present disclosure to the precise form disclosed.

DETAILED DESCRIPTION

Embodiments may be implemented for 8 channel surge profile support that can avoid arcing that might otherwise result from voltage differentials across a resistor in a Bob Smith termination. This voltage differential can be, for example, on the order of several hundred volts, which could result in arcing over the body, or exceeding the breakdown voltage of the Bob Smith Capacitors.

Embodiments may be configured to overcome this arcing by separating the Bob Smith termination capacitor between two sets of the 8 channels, such that there are now two Bob Smith terminations for the set of 8 channels instead of one. This allows each Bob Smith termination to more closely track its respective input surge. Due to the close tracking, the voltage difference would be zero (or negligible) and arcing can be avoided.

Figure 1:
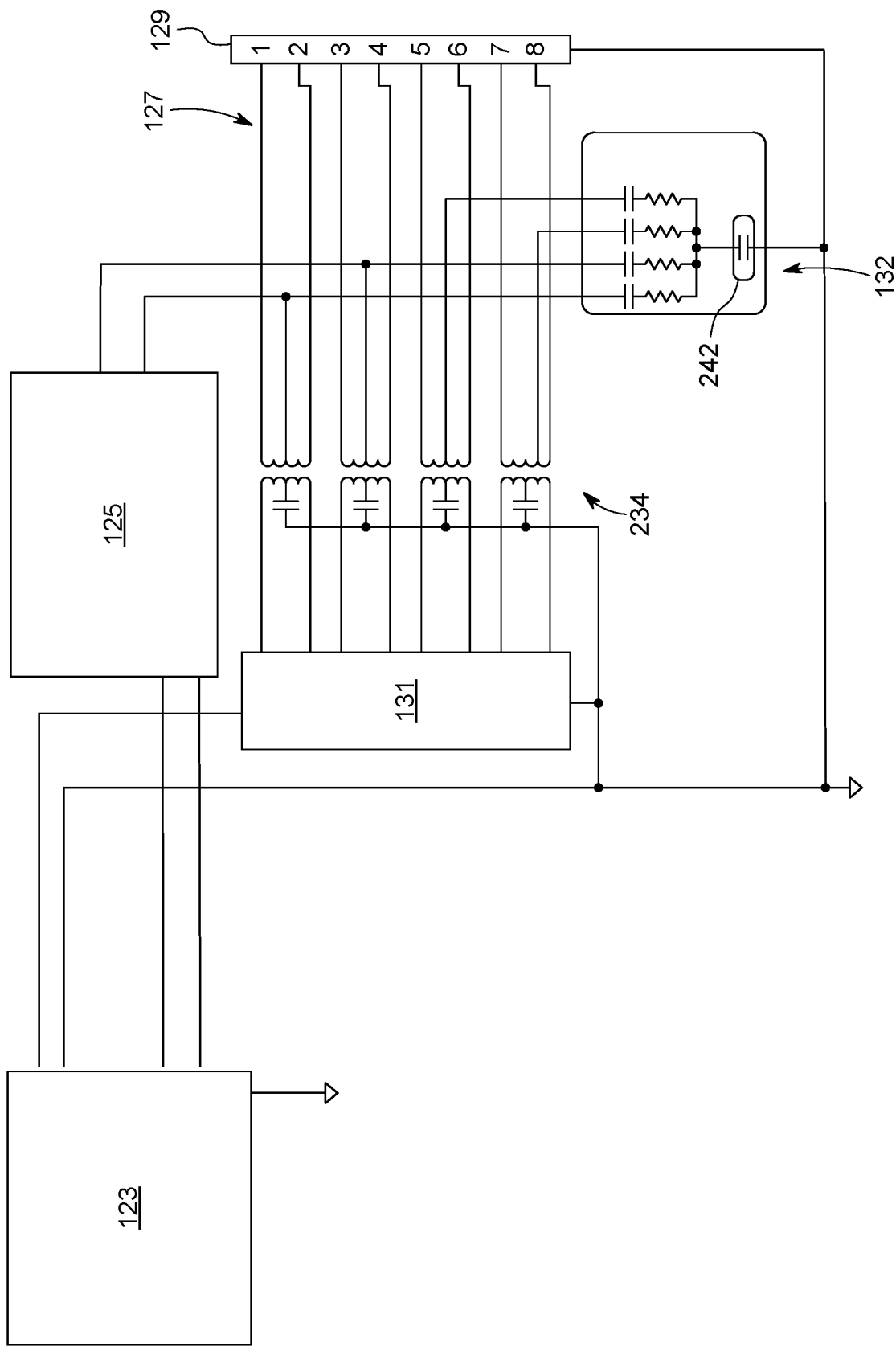
FIG. 1 illustrates an example of a Power over Ethernet (PoE) Power-Sourcing Equipment (PSE) system with which embodiments may be implemented.

FIG. 1 illustrates an example of a Power over Ethernet (PoE) Power-Sourcing Equipment (PSE) system with which embodiments may be implemented. In this example, the PoE PSE system includes an AC-DC converter 123, a PSE controller 125, an eight-wire interface 127 with a connector 129 and an Ethernet physical device 131. This example also includes a Bob Smith termination 132 to reduce longitudinal or common mode current on the conductor pairs.

Power surges, which may harm physical device 131, can be introduced through ethernet ports. These can come in the form of common mode or differential mode transients. For common mode surges, all of the conductors develop the same potential measured with respect to ground. Because all of the conductors are at the same voltage level, the current does not flow from one conductor to the other. Instead, it flows through the physical device to ground. Including a Bob Smith termination 132 provides a path for current to flow through the conductor to ground via the Bob Smith termination 132. The illustrated example includes connections to ground for the various equipment as well as for the Bob Smith terminations that can create paths to ground for common mode surge currents.

For differential mode surges, which occur between two conductors in the same cable, current flows into the ethernet port on one line of the differential pair, through the isolation transformer, and out of the ethernet port on the other line of the differential pair. The current flowing through the isolation transformer may induce a surge on the secondary winding of the isolation transformer, causing differential mode current flow at the physical device 131. Transient Voltage Suppressor (TVS) diodes (not shown) may be used to protect the physical device from these surges. However, this design can lead to high voltage differences and arcing in some circumstances.

Figure 2A:
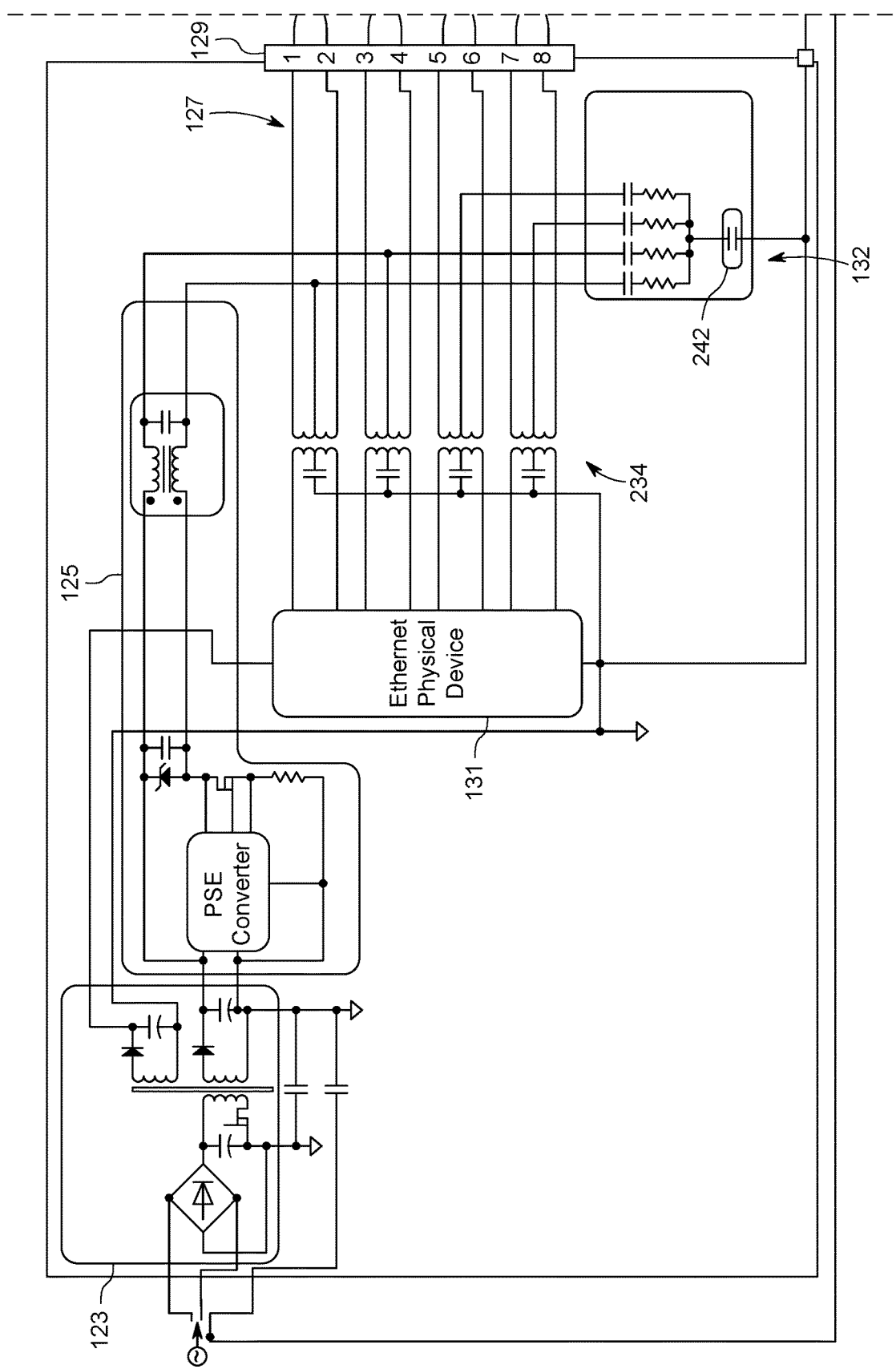
FIGS. 2A and 2B, illustrates a conventional solution for surge testing protection in a PoE PSE setup.
Figure 2B:
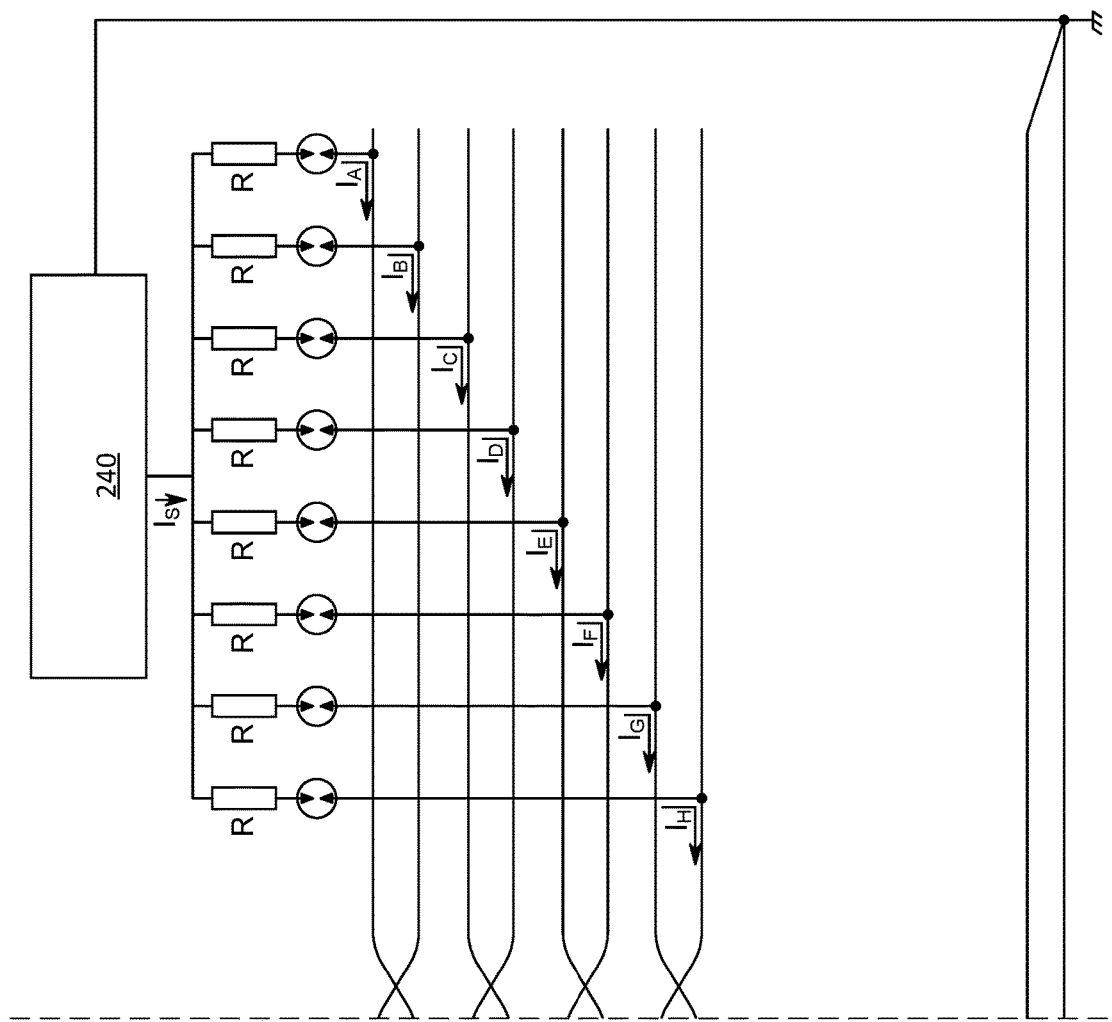

FIG. 2, which comprises FIGS. 2A and 2B, illustrates a conventional solution for surge testing protection in a PoE PSE setup. Similar to the example of FIG. 1, this example includes an AC-DC converter 123, a PSE controller 125, an eight-wire interface 127 with a connector 129, an Ethernet physical device 131, and a Bob Smith termination 132. This example illustrates that eight-wire interface 127 may include isolation transformers 234, one for each signal pair, which form an isolation barrier to the physical device 131. The Bob Smith termination 132 is connected at the center tap of isolation transformers 234. Each center tap is connected to a respective capacitor and resistor in series, each of which are coupled to a common decoupling capacitor which is connected to ground at the other end.

The example in FIG. 2 also includes a surge generator 240 to generate a surge current used to test the surge protection of the ethernet interface. Surge current from surge generator 240 is divided into 8 paths and connected into eight-wire interface 127 as current paths $I_A$-$I_H$. Upon passing through the connector 129 into 8-wire interface 127, these currents seek available paths to ground. This example illustrates paths to ground through Bob Smith termination 132 and through the AC-DC converter 123. Decoupling capacitor 242 in Bob Smith termination 132 provides such a path.

Figure 3:
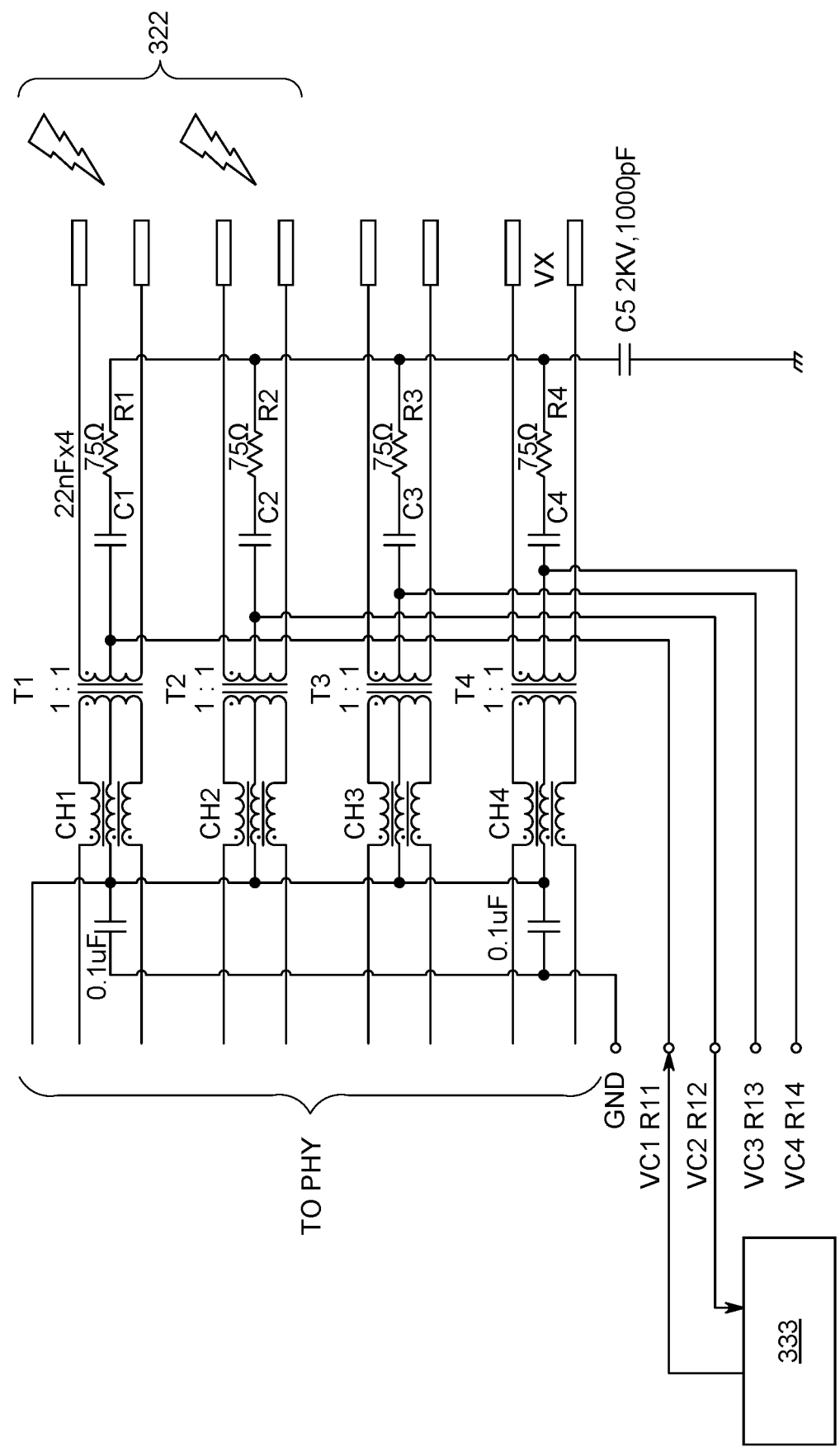
FIG. 3 illustrates a conventional design for 4 channel surge implementing Bob Smith terminations using a single Bob Smith termination capacitor to ground.
Figure 4:
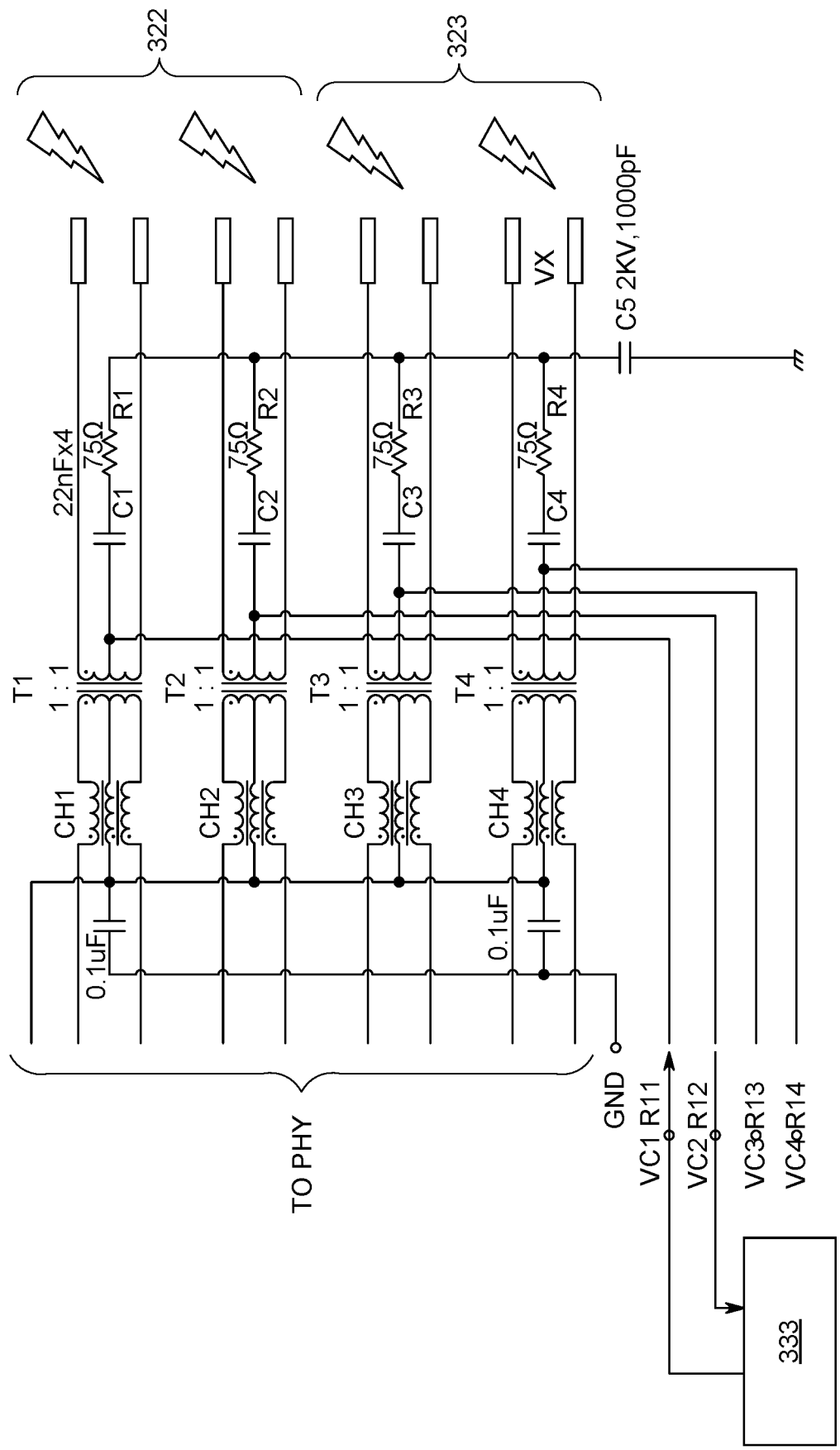
FIG. 4 illustrates a design for 8 channel surge implementing Bob Smith terminations using a single Bob Smith termination capacitor to ground.

FIG. 3 illustrates a conventional design for 4 channel surge implementing Bob Smith terminations using a single Bob Smith termination capacitor to ground. FIG. 4 illustrates a design for 8 channel surge implementing Bob Smith terminations using a single Bob Smith termination capacitor to ground. Referring now to FIGS. 3 and 4, these examples illustrate the Bob Smith termination including four capacitor/resistor pairs made up of pairs of AC coupling capacitors C1, C2, C3 and C4 (e.g., 22 nf, 100V), and their corresponding resistors R1, R2, R3 and R4 (e.g., 750 resistors), connected to ground via termination capacitor C5. Four isolating transformers, T1, T2, T3 and T4 are provided, wherein each isolating transformer comprises a center tap and a primary winding connected between its corresponding pair of the eight signal paths. Each AC coupling capacitor C1, C2, C3 and C4 is coupled to the center tap of its respective isolation transformer T1, T2, T3 and T4 at corresponding nodes V1, V2, V3 and V4. This example also illustrates PSE loading connected to nodes VC1 and VC2.

On the isolation side of transformers T1, T2, T3 and T4 or four chokes CH1, CH2, CH3, and CH4 ultimately connecting each signal pair to its respective input of the physical device. With reference to FIG. 3, when 4 channel surge is injected (e.g., at 322), the surge would see the PSE loading (e.g., from a PSE daughter card 333) at VC1 and VC2 and start to slow down the rising edge. Due to the common capacitor C5 (e.g., 1000 pF, 2 kV), the VC3 and VC4 nodes would have almost the same voltage level as the VC1 and VC2 nodes. Therefore there is no significant voltage difference that would be expected to cause arcing. However, this is not the case with 8 channel loading.

When 8 channel surge is injected, the surge at 322 would see PSE daughter card loading and start to slow down the rising edge, as described above with reference to FIG. 3. However, the surge at 323 would force the VC3 and VC4 to have a much faster rise time due to the occurrence of an open load. With the high voltage differences of VC1 and VC3 and VC4, and of VC2 and VC3 and VC4, the AC coupling capacitors C1, C2, C3 and C4 would reach their breakdown voltage limit and start to have high current flow thru. In many instances, the 750 R1, R2, R3 and R4 resistors would also being damaged. This is a real life application in transient events, as all the energy would be expected to be coupled into all the pairs evenly. Accordingly, the current solution, were it to be used for 8 channel surge profile support as shown below (FIG. 3), would cause arcing.

Figure 5:
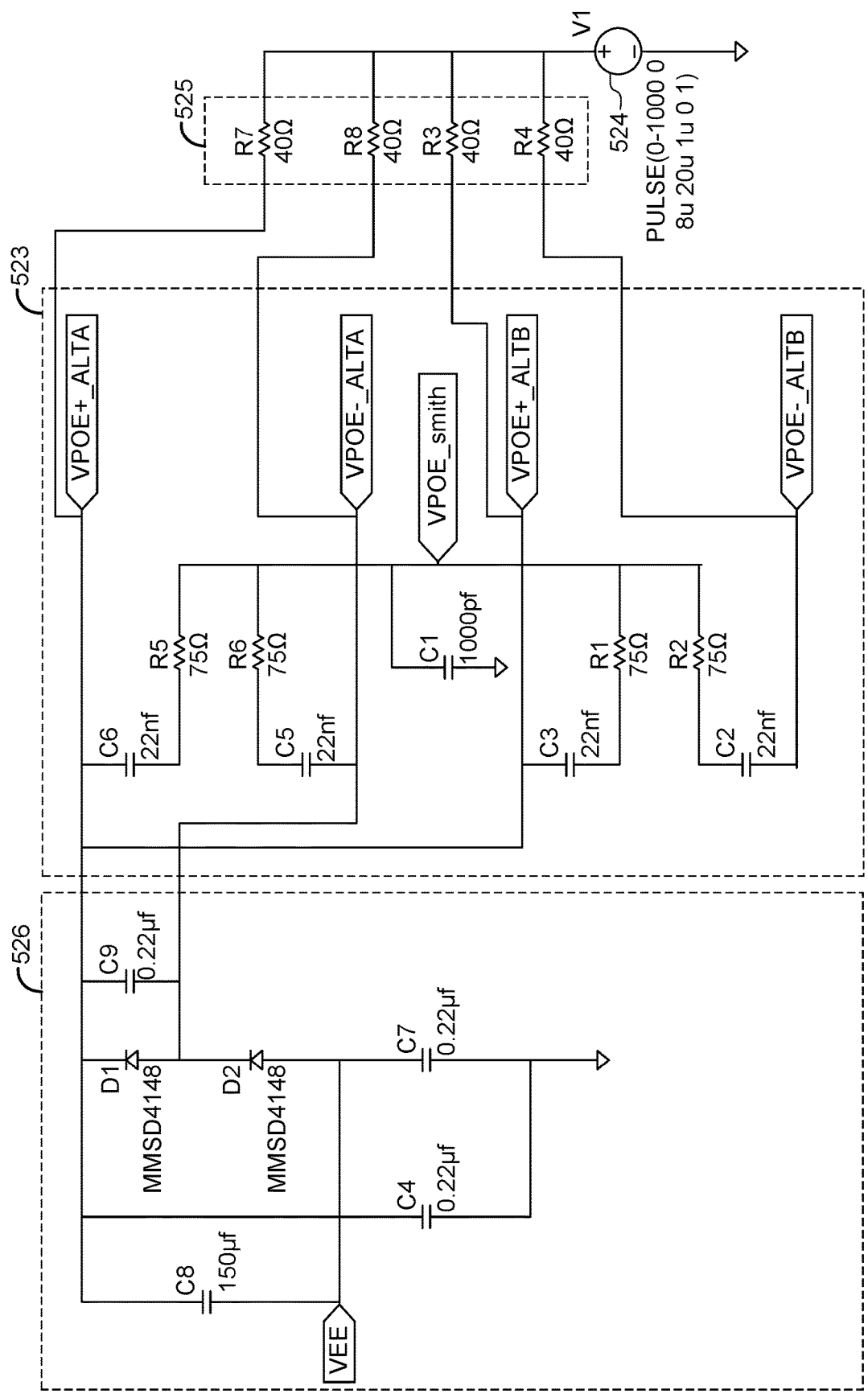
FIG. 5 illustrates another example implementing Bob Smith terminations using a single Bob Smith termination capacitor to ground.

FIG. 5 illustrates another example implementing Bob Smith terminations using a single Bob Smith termination capacitor to ground. This figure illustrates a circuit for surge testing similar to that of FIGS. 3 and 4, but illustrates the center tap only for simplicity. The circuit may include a twisted pair corresponding to each center tap. This example includes Bob Smith termination circuit 523, each termination point including a capacitor/resistor pair made up of pairs of AC coupling capacitors C2, C3, C5 and C6 (e.g., 22nf, 100V), and their corresponding resistors R2, R1, R6, and R5 (e.g., 750 resistors), connected to ground via termination capacitor C1. Although not illustrated to avoid clutter in the drawing, four isolating transformers may be provided, wherein each isolating transformer comprises a center tap and a primary winding connected between its corresponding pair of the eight signal paths.

This example also includes a transient energy source 524 that can provide a transient pulse or other transient signal for testing purposes. The signal is provided through resistors R3, R4, R8 and R72 nodes VPoE−ALTB, VPoE+ALTB, VPoE−ALTA and VPoE+ALTA, respectively. Resistors in the resistor group 525 are included in this example and can be provided to meet test requirements. In the illustrated example, resistors R3, R4, R7 and R8 can be provided for the test set up as required by the International Electrotechnical Commission's international standard on surge immunity, IEC61000 4-5 standard. A further example test set up is provided in FIG. 7, as discussed below. Components in the group 526 provide an example of loading that might be implemented at the PSE side.

Similar to FIG. 4, the solution illustrated in FIG. 5, were it to be used for 8 channel surge profile support, would cause arcing. That is, the VPoE−ALTB would see voltage differentials between Vbob_smith and itself, and with the voltage difference being on the order of several hundred volts, arcing over the body would occur, or the breakdown voltage of the C2, C3, C5, C6 caps would be exceeded. Also, resistors R2, R1, R6, and R5 could potentially be damaged.

Embodiments may be implemented to overcome this problem by separating the Bob Smith termination capacitor between the ALT_A nodes and the ALT_B nodes so that each set of four channels (i.e., the channels corresponding to the ALT_A nodes and the channels corresponding to the ALT_B nodes) has its own Vbob_smith termination. This allows each Bob Smith termination to more closely track its corresponding input surge. Because of the close tracking, the voltage difference would be zero (or negligible). Therefore, no arcing would occur on the ALT_B PoE pairs.

Figure 6:
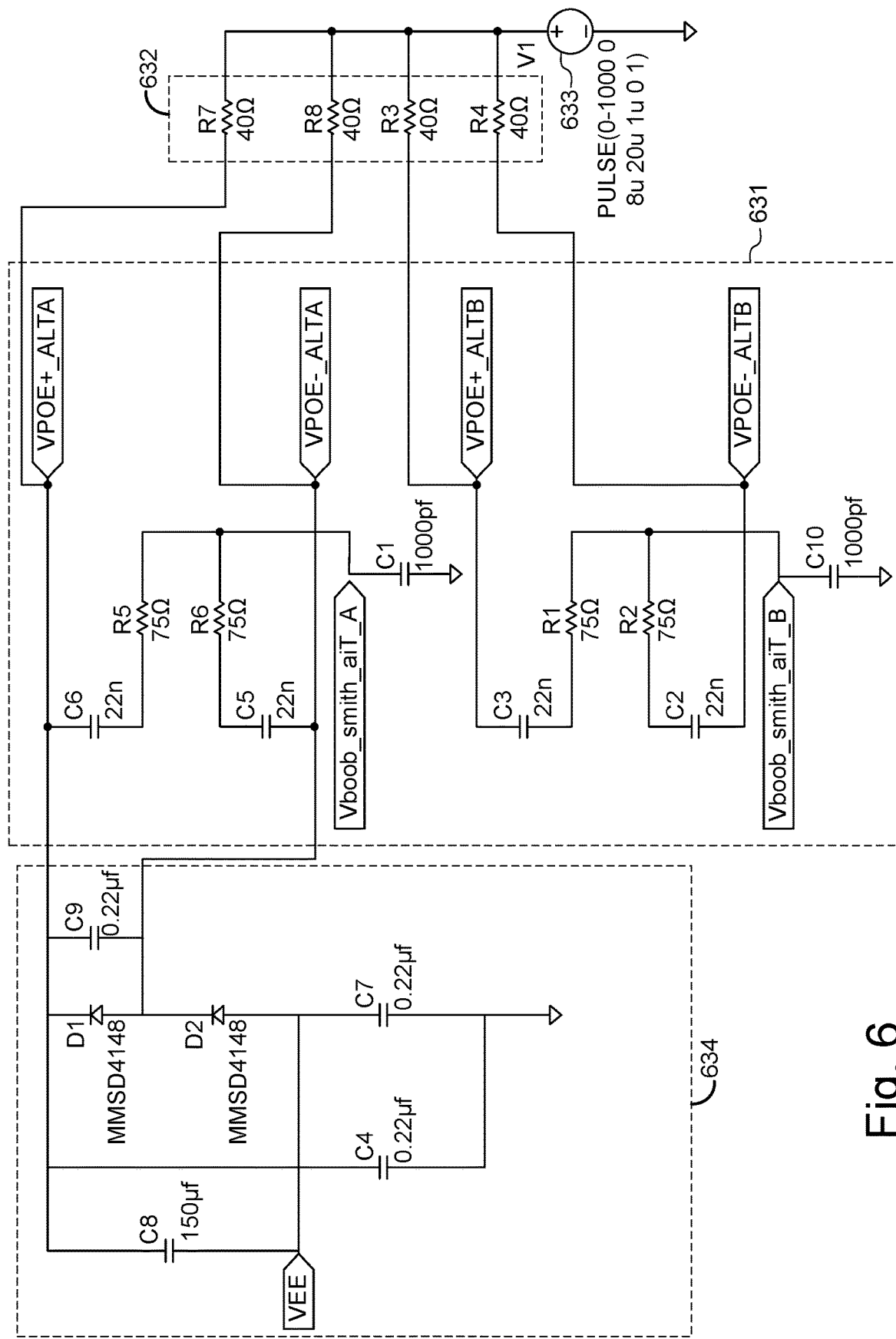
FIG. 6 illustrates an example of providing separate Bob Smith termination capacitors for the nodes corresponding to 2 sets of 4 channels in accordance with various embodiments.

FIG. 6 illustrates an example of providing separate Bob Smith termination capacitors for the nodes corresponding to 2 sets of 4 channels in accordance with various embodiments. This figure illustrates a circuit for surge testing similar to that of FIGS. 3 and 4, but illustrates the center tap only for simplicity. The circuit may include a twisted pair corresponding to each center tap. In this example, the four channels corresponding to the ALT_A nodes are connected through a termination capacitor C1 and the four channels corresponding to the ALT_B nodes are connected through a separate termination capacitor C 10, which is different from C1.

As seen in this example, this circuit includes Bob Smith termination circuit 631, resistor group 632, surge generator 633 and PSE components 634. Surge generator 633 and resistor group 632 may be implemented in accordance with the International Electrotechnical Commission's international standard on surge immunity, the IEC61000 4-5 standard.

In Bob Smith termination circuit 631, each termination point including a capacitor/resistor pair made up of pairs of AC coupling capacitors C2, C3, C5 and C6 (e.g., 22 nf, 100V), and their corresponding resistors R2, R1, R6, and R5 (e.g., 750 resistors). Although not illustrated to avoid clutter in the drawing, four isolating transformers may be provided, wherein each isolating transformer comprises a center tap and a primary winding connected between its corresponding pair of the eight signal paths.

This is similar to the example of FIG. 5. However, in the example of FIG. 6, capacitor/resistor pairs C2 R2 for node VPoE−ALTB and C3 R1 for node VPoE+ALTB are terminated through Bob Smith termination capacitor C10, while capacitor/resistor pairs C5 R6 for node VPoE−ALTA and C6 R5 for node VPoE+ALTA are terminated through Bob Smith termination capacitor C1.

By separating the Bob Smith termination capacitor between the ALT_A nodes and the ALT_B nodes so that each set of four channels (i.e., the channels corresponding to the ALT_A nodes and the channels corresponding to the ALT_B nodes) has its own Vbob_smith termination. This allows each Bob Smith termination to more closely track its corresponding input surge. Because of the close tracking, the voltage difference would be zero (or negligible). Therefore, no arcing would occur on the ALT_B PoE pairs.

FIG. 7 illustrates an example surge generator circuit that can be used in accordance with various embodiments. The example illustrated in FIG. 7 includes a surge generator 732 and a direct coupling module 734. Surge generator 732 may have a selectable output impedance, $R_{GEN}$, in various embodiments.

Embodiments may use conventional surge generators and may generate combination waveforms (CWF) in the ranges of:

$$1.2/50 \text{ μs–}8/20 \text{ μs} \qquad \text{A.}$$

$$10/700 \text{ μs–}5/320 \text{ μs} \qquad \text{B.}$$

The surge generator may have impedance capabilities of $R_{GEN}$:

$$R_{GEN}=2\Omega \text{ or } 12\Omega; \text{ For CWF } A \qquad \text{A.}$$

$$R_{GEN}=15\Omega \text{ or } 40\Omega; \text{ For CWF } B \qquad \text{B.}$$

Direct coupling module 734 may be included to directly couple surge energy onto Data I/O Ethernet cabling used with PoE products. The coupling method that may be used for DISI test is direct coupling via gas arrestors. Surge energies may be directly coupled to unshielded symmetrical conductors, so that there is no need for a secondary coupling network. A decoupling network may be included to properly protect peripheral Auxiliary Equipment (AE).

The Effective Output Impedance, REO, is the total impedance of the surge generator and coupling module of each individual channel, and may comply with these requirements.

$$R_{EO} = R_{GEN} + R_{M2\_PARALLEL} \qquad \text{Equation 1}$$

$$R_{M2\_Parallel} = \frac{R_{M2\_Channel}}{n_{Channel}} \qquad \text{Equation 2}$$

where; [1] $R_{M2\_Channel}$ is the per-channel resistance
[2] $n_{channel}$ is number of channels under test Each CWF and number of channels-under-test (or "Channel Mode") combination may use separate coupling modules in order to meet the Effective Output Impedance ($R_{EO}$). This results in 4 CMs (or more) to cover the test conditions as set forth in Table 1. Table 2 sets forth example coupling module configurations in accordance with various embodiments.

TABLE 1

Coupling Module Matrix

| CWF ↓ | Coupling Module Example | | $R_{EO}$ ↓ |
| --- | --- | --- | --- |
| | 4-Channel (2-Pair) | 8-Channel (4-Pair) | |
| 1.2/50–8/20 μs | $CM_{1-1}$ | $CM_{1-2}$ | 42 Ω ± 5%; |
| 10/700–5/320 μs | $CM_{2-1}$ | $CM_{2-2}$ | 40 Ω ± 5%; |

TABLE 2

Direct Coupling Module Example Configurations

| Waveform | Channels | $R_{M2\_Channel}$ | $R_{M2\_Parallel}$ | $R_{GEN}$ | $R_{EO}$ | $CM_{EXAMPLE}$ |
| --- | --- | --- | --- | --- | --- | --- |
| A | 4 | 160 Ω | 40 Ω | 2 Ω | 42 Ω | $CM_{1-1}$ |
| A | 8 | 320 Ω | 40 Ω | 2 Ω | 42 Ω | $CM_{1-2}$ |
| A | 4 | 120 Ω | 30 Ω | 12 Ω | 42 Ω | $CM_{1-1}$ |
| A | 8 | 240 Ω | 30 Ω | 12 Ω | 42 Ω | $CM_{1-2}$ |
| B | 4 | 100 Ω | 25 Ω | 15 Ω | 40 Ω | $CM_{2-1}$ |
| B | 8 | 200 Ω | 25 Ω | 15 Ω | 40 Ω | $CM_{2-2}$ |

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A module for 8-channel surge protection for a network utilizing Power Over Ethernet (PoE), comprising:
   eight signal paths organized in four pairs, wherein each pair of the eight signal paths is coupled to a respective one of four PoE nodes; and
   four Bob Smith terminations arranged such that one Bob Smith termination is coupled to each of the four PoE nodes, each Bob Smith termination comprising a capacitor and a resistor pair, the capacitor coupled in series between its respective PoE node and the resistor, and the resistor connected in series to a respective Bob Smith termination node, wherein a first pair of the Bob Smith terminations is connected between their respective PoE nodes and a first Bob Smith node and a second pair of the Bob Smith terminations is connected between their respective PoE nodes and a second Bob Smith node;
   wherein the first Bob Smith node is capacitively isolated from ground via a first terminating capacitor component and a second Bob Smith node is capacitively isolated from ground via a second terminating capacitor component separate from the first terminating capacitor component.

2. The module of claim 1, further comprising four isolating transformers, wherein each isolating transformer comprises a center tap and a primary winding connected between its corresponding pair of the eight signal paths.

3. The module of claim 2, wherein each pair of the eight signal paths is coupled to a respective one of four nodes via its respective isolating transformer.

4. The module of claim 3, wherein a center tap of each isolating transformer is connected to a respective one of the four nodes.

5. The module of claim 1, wherein a first two of the four nodes are connected to a power source equipment power supply.

6. The module of claim 5, further comprising an EMI filter coupled between the power source equipment power supply and the first two of the four nodes.

7. The module of claim 5, further comprising a transient voltage suppressor (TVS) diode array coupled between the power source equipment power supply and the first two of the four nodes.

8. The module of claim 1, wherein a voltage at the first Bob Smith node need not be the same as a voltage at the second Bob Smith node.

9. A module for testing 8-channel surge protection for a network utilizing Power Over Ethernet (PoE), comprising:
 a surge generator;
 a coupling module comprising an input coupled to the surge generator and further comprising eight parallel outputs to output a surge energies on eight channels;
 eight signal paths, each coupled to an output of the coupling module, the 8 signal paths organized in four pairs, wherein each pair of the eight signal paths is coupled to a respective one of four PoE nodes; and
 four Bob Smith terminations arranged such that one Bob Smith termination is coupled to each of the four PoE nodes, each Bob Smith termination comprising a capacitor and a resistor pair, the capacitor coupled in series between its respective PoE node and the resistor, and the resistor connected in series to a respective Bob Smith termination node, wherein a first pair of the Bob Smith terminations is connected between their respective PoE nodes and a first Bob Smith node and a second pair of the Bob Smith terminations is connected between their respective PoE nodes and a second Bob Smith node;
 wherein the first Bob Smith node is capacitively isolated from ground via a first terminating capacitor component and a second Bob Smith node is capacitively isolated from ground via a second terminating capacitor component separate from the first terminating capacitor component.

10. The module of claim 9, further comprising four isolating transformers, wherein each isolating transformer comprises a center tap and a primary winding connected between its corresponding pair of the eight signal paths.

11. The module of claim 10, wherein each pair of the eight signal paths is coupled to a respective one of four nodes via its respective isolating transformer.

12. The module of claim 11, wherein a center tap of each isolating transformer is connected to a respective one of the four nodes.

13. The module of claim 9, wherein a first two of the four nodes are connected to a power source equipment power supply.

14. The module of claim 13, further comprising an EMI filter coupled between the power source equipment power supply and the first two of the four nodes.

15. The module of claim 13, further comprising a transient voltage suppressor (TVS) diode array coupled between the power source equipment power supply and the first two of the four nodes.

16. The module of claim 9, wherein a voltage at the first Bob Smith node need not be the same as a voltage at the second Bob Smith node.

17. A method of testing 8-channel surge protection for a network utilizing Power Over Ethernet (PoE), comprising:
 a surge generator generating a surge energy;
 coupling via a coupling module the surge energy generated by the surge generator onto eight signal paths, the 8 signal paths organized in four pairs, wherein each pair of the eight signal paths is coupled to a respective one of four PoE nodes;
 directing current from the surge energy to ground via four Bob Smith terminations arranged such that one Bob Smith termination is coupled to each of the four PoE nodes, wherein a first pair of the Bob Smith terminations is connected between their respective PoE nodes and a first Bob Smith node and a second pair of the Bob Smith terminations is connected between their respective PoE nodes and a second Bob Smith node;
 wherein the first Bob Smith node is capacitively isolated from ground via a first terminating capacitor component and a second Bob Smith node is capacitively isolated from ground via a second terminating capacitor component separate from the first terminating capacitor component.

18. The method of claim 17, wherein a voltage at the first Bob Smith node need not be the same as a voltage at the second Bob Smith node.

19. The method of claim 17, wherein coupling the surge energy generated by the surge generator onto eight signal paths comprises direct coupling via gas arrestors.

20. The method of claim 17, wherein an Effective Output Impedance, $R_{EO}$, comprises the total impedance of the surge generator and coupling module of each individual channel, and the $R_{EO}$ complies with:

$$R_{EO} = R_{GEN} + R_{M2\_PARALLEL}.$$

* * * * *